United States Patent
Marsh et al.

US006876974B1

(10) Patent No.: US 6,876,974 B1
(45) Date of Patent: *Apr. 5, 2005

(54) SCHEDULING THE PRESENTATION OF MESSAGES TO USERS

(75) Inventors: Brian D. Marsh, New York, NY (US); Jon D. Mc Auliffe, New York, NY (US)

(73) Assignee: Juno Onhhe Services, Inc., Woodland Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/206,343

(22) Filed: Dec. 7, 1998

Related U.S. Application Data

(63) Continuation of application No. 08/636,745, filed on Apr. 19, 1996, now Pat. No. 5,848,397.

(51) Int. Cl.[7] .............................................. G06F 17/60
(52) U.S. Cl. ............................ 705/14; 705/26; 235/383
(58) Field of Search ............................... 705/14, 26, 30, 705/1, 7, 8, 9, 10; 235/383, 462.3; 707/501, 573, 10, 100; 725/66, 32, 68; 348/473

(56) References Cited

U.S. PATENT DOCUMENTS

| | | | | |
|---|---|---|---|---|
| 5,283,731 A | * | 2/1994 | Lalonde et al. ................. | 705/1 |
| 5,392,066 A | * | 2/1995 | Fisher et al. ................... | 348/8 |
| 5,442,771 A | | 8/1995 | Filepp et al. | |
| 5,446,919 A | | 8/1995 | Wilkins | |
| 5,483,466 A | * | 1/1996 | Kawahara et al. | |
| 5,524,077 A | * | 6/1996 | Faaland et al. | |
| 5,584,025 A | | 12/1996 | Keithley et al. | |
| 5,664,948 A | * | 9/1997 | Dimitriadis et al. ......... | 434/307 |
| 5,696,965 A | * | 12/1997 | Dedrick | |
| 5,717,923 A | * | 2/1998 | Dedrick | |
| 5,781,430 A | * | 7/1998 | Tsai ............................. | 700/28 |
| 5,781,894 A | * | 7/1998 | Petrecca et al. .............. | 705/14 |
| 5,794,210 A | | 8/1998 | Goldhaber et al. | |
| 5,812,950 A | * | 9/1998 | Tom ............................ | 455/440 |
| 5,848,397 A | * | 12/1998 | Marsh et al. ................. | 705/14 |

(Continued)

FOREIGN PATENT DOCUMENTS

| | | | |
|---|---|---|---|
| CA | 2244002 | | 7/1997 |
| CA | 2247325 | | 9/1997 |
| GB | 2328537 | | 11/1997 |
| JP | 5143653 | * | 6/1993 |
| JP | 2000137721 A | * | 5/2000 |
| WO | WO 97/21183 | | 6/1997 |
| WO | WO 32257 | | 7/1997 |
| WO | WO 97/43724 | | 11/1997 |

OTHER PUBLICATIONS

Derwent_Acc_No.: 2001–032364, Doherty, S. M.; Sep. 2000.*
Dedrick, Interactive Electronic Advertising, IEEE Multimedia 1999 (Intel Architecture Labs), 1994.
Dedrick, A Consumption Model for Targeted Electronic Advertising, IEEE Multimedia, Summer 1995, pp 41–49 (Intel Architecture Labs), Summer, 1995.

*Primary Examiner*—Pierre E. Elisca
(74) *Attorney, Agent, or Firm*—SoCal IP Law Group; Steven C. Sexeboff; Mark A. Goldstein

(57) ABSTRACT

An advertisement display scheduler resident on a user's computer receives advertisements from a server system over a network. Upon receipt, the advertisement display scheduler determines the priority of the advertisement and assigns it to one of a plurality of prioritized advertisement queues. Each queue is sorted according to predetermined scheduling criteria so that advertisements deemed "more important" are presented to a user first. The advertisement display scheduler logs statistical information relating to the presentation of advertisements for use in updating the scheduling criteria, and makes such statistical information available to the server system.

74 Claims, 8 Drawing Sheets

U.S. PATENT DOCUMENTS

| | | | |
|---|---|---|---|
| 5,913,040 A | | 6/1999 | Rakavy et al. |
| 5,918,014 A | * | 6/1999 | Robinson ............... 395/200.49 |
| 5,933,811 A | * | 8/1999 | Angles et al. ................ 705/14 |
| 5,937,392 A | * | 8/1999 | Alberts ....................... 705/14 |
| 5,948,061 A | | 9/1999 | Merriman et al. |
| 5,957,695 A | * | 9/1999 | Redford et al. ............. 434/307 |
| 6,026,368 A | | 2/2000 | Brown et al. |
| 6,064,967 A | * | 5/2000 | Speicher ....................... 705/1 |
| 6,157,946 A | | 12/2000 | Itakura et al. |

* cited by examiner

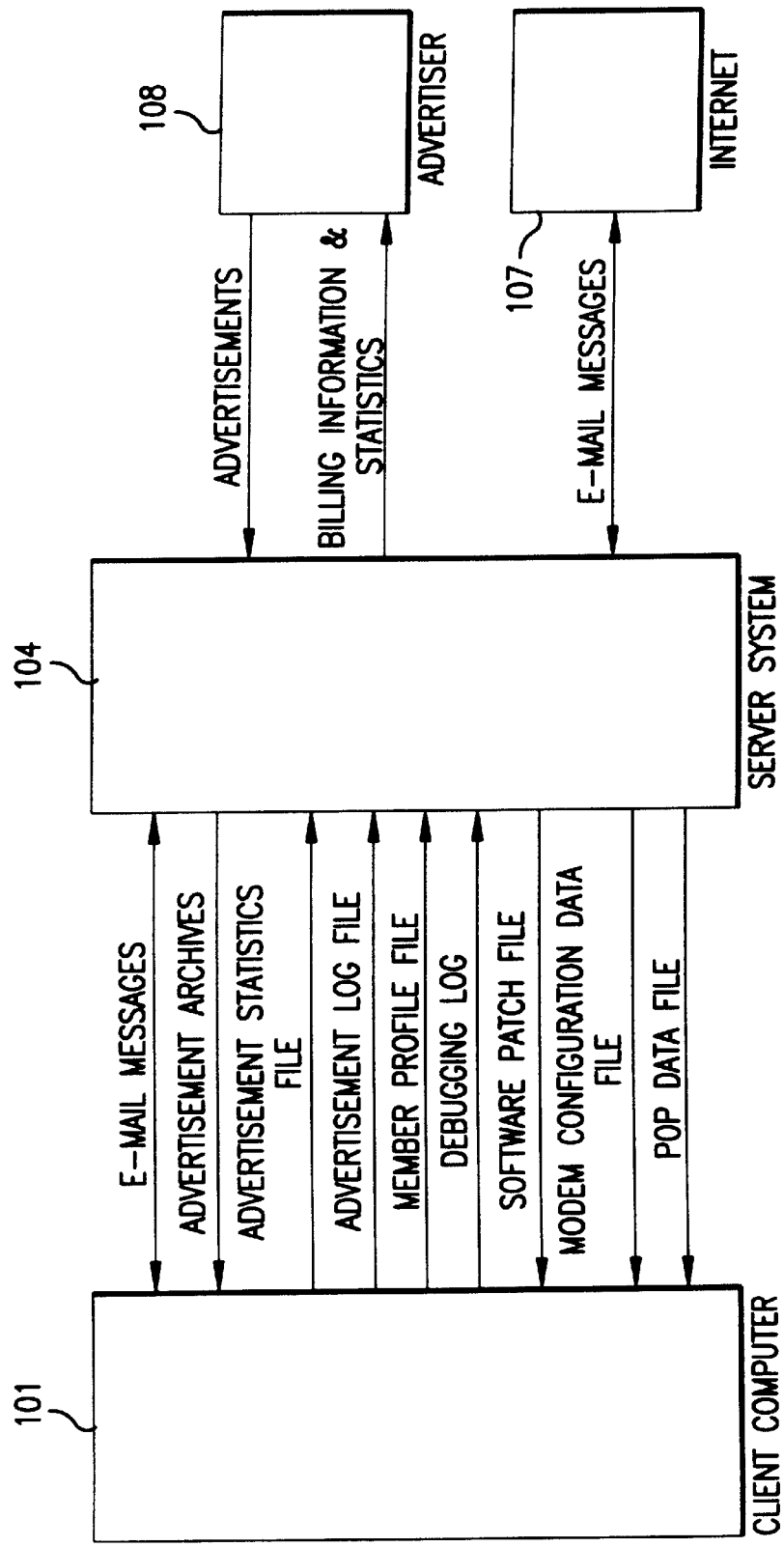

SCHEDULING THE PRESENTATION OF MESSAGES TO USERS

This is a continuation of application Ser. No. 08/636,745, filed on Apr. 19, 1996 and issued as U.S. Pat. No. 5,848,397 on Dec. 8, 1998.

COPYRIGHT NOTICE

This patent document contains material subject to copyright protection. The copyright owner has no objection to the reproduction of this patent document or any related materials in the files of the United States Patent and Trademark Office, but otherwise reserves all copyrights whatsoever.

BACKGROUND OF THE INVENTION

The present invention relates generally to the field of computer networking, and specifically to a system by which users of on-line computer networks may be exposed to a continuously-changing variety of advertisements. The invention is particularly well-suited for providing advertising to users of electronic mail systems while such users are not connected to an on-line network.

Electronic mail, or "e-mail," is an increasingly popular way for people to communicate. E-mail allows a person to quickly and easily send textual messages and other information (e.g., pictures, sound recordings, formatted documents) electronically to other e-mail users anywhere in the world.

An e-mail user will typically create a message using an e-mail program running on a computer connected to a computer network through a modem. The message will include an e-mail "address" for the intended recipient. When the user has finished entering the message, the user may "send" the message to the intended recipient. The e-mail program then electronically transmits the message over the computer network. The recipient, using an e-mail program running on his or her own computer, can then "receive" the message.

In recent years the Internet has become the most popular computer network used by consumers and businesses to send and receive e-mail. The Internet allows users to readily send and receive e-mail to and from computers around the world. Each user typically has a unique Internet e-mail address (e.g., bob@pto.com). A user with an e-mail account and a computer capable of connecting to the Internet can easily send and receive e-mail over the network.

Users desiring to connect to the Internet to send and receive e-mail are faced with an ever-increasing variety of service options. For example, a user can subscribe to a proprietary on-line network such as Prodigy, America Online, Compuserve or Microsoft Network. Using a standard personal computer equipped with a modem, the user dials an access number to connect to proprietary on-line network. The user can then send and receive e-mail to and from other users of that proprietary network and, provided that the network is connected to the Internet, with any other user having an Internet e-mail address.

An alternative method for accessing the Internet is through an Internet Service Provider. Again using a modem, the user dials the access number of an Internet Service Provider to establish a connection with a computer "directly" connected to, or part of, the Internet. The user can then use an e-mail program, such as Eudora, to send and receive e-mail over the Internet.

The foregoing are merely examples of the ways that users can establish a connection with on-line networks to send and receive e-mail. Many other access methods exist today, and others will continue to become available as use of the Internet becomes more and more common. The present invention is not dependent upon any particular access method.

A major disadvantage of existing e-mail systems, at least from the standpoint of the user, is that the user must pay for the e-mail service. For example, proprietary on-line networks and Internet Service Providers charge users in a number of ways, including monthly access fees, hourly connect fees, fees charged on a per-message basis, and fees based on the number of characters sent by e-mail. Providing reliable e-mail service is costly in view of hardware, software and communication requirements.

A system for providing e-mail service to users is described in a co-pending U.S. patent application entitled "Electronic Mail System with Advertising" in the named of David E. Shaw, Charles E. Ardai, Brian D. Marsh, Mark A. Moraels, Dana B. Rudolph and Jon D. McAuliffe, filed concurrently herewith. In that system, the cost of providing e-mail service need not be recouped from individual users, but rather, can be recouped from advertisers. The specification of that application is expressly incorporated herein by reference in its entirety.

Apart from the Applicants' innovative e-mail system, some on-line service providers also display advertising to their users. For example, the America Online network displays advertisements to users on a portion of their computer screen. Likewise, advertisements are often included as part of web pages seen by users when accessing certain World Wide Web sites on the Internet. Often in such systems, every user accessing a certain screen or site is shown the same advertisement. More sophisticated systems have the capability to change an advertisement after a certain period of time. Nevertheless, such systems generally require that the user be connected to the on-line network to view the advertisements.

With many existing on-line networks, users must be connected to the on-line network to read and write e-mail messages. This is undesirable for several reasons. From the service provider's view, operating costs (including communication and hardware costs) are necessarily higher when users are connected to network. From the user's view, many on-line service providers charge fees based on connect time. Accordingly, it is more cost-effective if e-mail users read and write their messages when off-line (i.e., when not connected to the on-line network), and only connect to the on-line network to actually send and receive e-mail messages (i.e., uploading messages to the network and downloading messages from the network).

Encouraging e-mail users to minimize on-line access is problematic for on-line service providers and their advertisers because existing systems do not permit advertisements to be displayed and/or updated when the user is off-line. Thus, even if an advertisement was downloaded to a user during a period of on-line access, the advertisement could become "stale." Advertisers would run the risk of users being numbed or otherwise negatively affected by their advertising as a result of overexposure. Accordingly, there is a need for a system whereby users of on-line networks can be exposed to a dynamic display of advertisements while the users are not connected to the on-line network.

Accordingly, there is a need for a system that schedules the distribution, downloading and display of advertisements to users of remote computers that maximizes advertiser revenues but minimizes system costs.

SUMMARY OF THE INVENTION

The present invention provides a method and apparatus for scheduling the distribution, downloading and presentation of a continuously-changing display to computer users. The invention is particularly well-suited to presenting advertisements to users of an electronic mail service, thereby eliminating the need to charge the users for the service.

In a representative embodiment of the present invention, an advertisement display scheduler resides on a user's computer (i.e., a client system) and manages the presentation of advertisements to the user. The advertisement display scheduler receives advertisements from a server system which communicates with the client system over a computer network.

The server system includes an advertisement distribution scheduler which determines the advertisements that are eligible for distribution to each user. The advertisement distribution scheduler may be used to target advertisements to particular users based on demographic information stored in a database management system resident on the server system. Demographic information may be obtained, for example, by having a user complete a survey, or member profile, when first accessing the client system (and upon later updates by the user). The member profile may include such information as the user's hobbies, interests, employment, education, sports, age and gender. The member profile would be transmitted for storage in the database management system the first time the user establishes a connection to the server system. This feature is particularly useful for targeted advertising.

The server system also includes an advertisement download scheduler which determines when the advertisements are transferred to each user. The advertisement download scheduler may ensure, for example, that high-priority advertisements are transmitted to a user before low-priority advertisements. Likewise, the advertisement download scheduler manages the number of advertisements that are transmitted at any given time, so that the user is not forced to wait unnecessarily for a long transmission of advertisements when there is no other need to be on-line.

Significantly, the advertisements to be shown to system users are not in any way correlated with a user's e-mail. Thus, the advertisements can be regarded as context independent. The e-mail messages come from a different source than that of the advertisements (e.g., e-mail messages originate from other network users, while the advertisements may originate from advertisers). There need not be any correlation between the number of e-mail messages sent and/or received and the number of advertisements transferred to or stored at the client computer. Indeed, in a representative embodiment, the advertisements are stored at the client computer in a different subdirectory from the e-mail messages, and are not linked to any particular e-mail message or messages. Control of the display of e-mail messages is likewise independent from the control of the presentation of advertisements; that is, the client program determines which advertisements to present and when, whereas the user determines which e-mail messages to read/write and when.

Upon receipt of an advertisement from the server system, the advertisement display scheduler determines the priority of the advertisement and assigns it to one of a plurality of prioritize advertisement queues (e.g., HIGH_PRIORITY, MEDIUM_PRIORITY, LOW_PRIORITY, NO_PRIORITY). Each of these priority queues are sorted according to predetermined scheduling criteria so that advertisements deemed to be "more important" are presented to a user first.

In one embodiment, the scheduling criteria for the advertisements include the time to expiration, time since last seen, maximum exposures to a user, and percentage of exposures remaining. The scheduling criteria are selected with the goal of maximizing the revenue to the e-mail service provider, subject to a "no starvation" constraint, in view of the particular billing arrangements with the vendors associated with the advertisements.

The advertisement display scheduler computes a partial ordering (i.e., which should come first) between all pairs of advertisements in the advertisement queues. Such an ordering is sufficient to determine a total ordering on the entire set of advertisements. To determine which of two advertisements should be presented first, the advertisement display scheduler computes a difference, or "delta," between the two advertisements with respect to a predetermined set of weighted scheduling criteria. The algebraic sign of the sum of these differences indicates which of the advertisements should be shown first.

The advertisement display scheduler of the present invention is capable of presenting a number of different types of advertisements to users according to the present status of the client system. For example, when the user is reading or writing e-mail messages, the advertisement display scheduler continuously presents a series of "banner advertisements" which appear above the workspace on the user's video monitor. When a connection to the server system is being established or during the retrieval of e-mail messages from the server system, the advertisement display scheduler additionally presents a series of "showcase advertisements" which occupy most or all of the workspace.

The advertisement display scheduler includes the ability to log statistics relating to the presentation of advertisements to users. For example, the advertisement display scheduler can track the number of times a given advertisement has been presented, and the period of time between presentations and user interaction with an advertisement (e.g., "clicking" on the advertisement to receive additional information). Such information is used by the advertisement display scheduler itself to update the scheduling criteria for the various advertisements, and is reported back to the server system for use in billing vendors.

Various features and advantages of the present invention are described below with reference to the drawings. Other features and advantages will be readily apparent to those skilled in the art.

BRIEF DESCRIPTION OF THE DRAWINGS

FIG. 8 describes the information that may be communicated between a client system and a server system according to an embodiment of the present invention.

DETAILED DESCRIPTION

The present invention is a scheduler system for use in controlling the selection, downloading and presentation of advertisements to users of a computer system. The invention is described in the context of an e-mail system having both client and server components. An advertisement display scheduler of the present invention is a client-based application, receives advertisements periodically from the server component, and determines when advertisements should be output. The server component includes an advertisement distribution scheduler, which determines the advertisements eligible for distribution to a user, and an advertisement download scheduler, which determines how and when advertisements are downloaded to the client system. The various components of these schedulers are described below, along with the underlying e-mail system in which these schedulers are incorporated.

Although the terms "client" and "server" are used herein to describe representative embodiments, the present invention is in no way limited to the architecture known in the art as a "client/server network."

The E-Mail System

Figure 1:
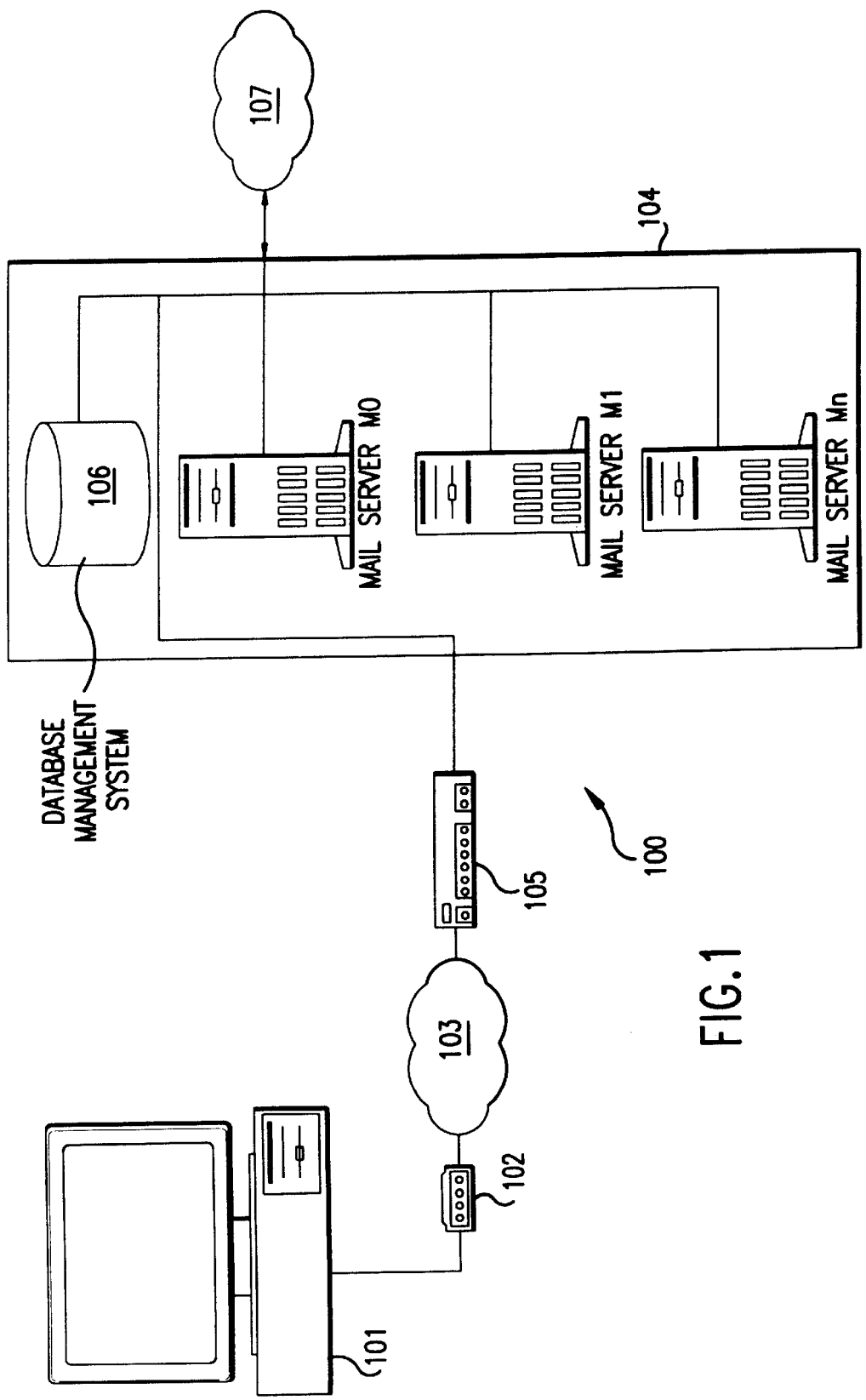
FIG. 1 is a block diagram of an exemplary e-mail system of a type to which an advertisement display scheduler configured according to the present invention may be applied.

Referring to FIG. 1, an exemplary e-mail system 100 of the type to which the present invention may be applied includes a client system 101 and a server system 104 which communicate with one another over a network 103. The client system 101 may be a workstation, personal computer or any other processor-based system capable of supporting at least one system user.

The client system 101 is connected to a communication interface 102 for allowing the client system 101 to communicate with other computer systems. As illustrated, the communications interface 102 is external to the client system 101, but an internal communications interface 102 is equally acceptable. Also, while the communications interface 102 of FIG. 1 is a modem intended to provide communication connectivity to remote systems via a network 103, such as a privately switched telephone network (PSTN), the communications interface 102 could alternatively be a network interface unit, a network card or some other comparable device providing connectivity to other computer systems over a network using such protocols as X.25, Ethernet, or TCP/IP.

Using the communications interface 102, the client system 101 selectively communicates with the server system 104 over the network 103 through a communications server 105. In the disclosed configuration, the communications server 105 couples the client system 101 to one of a plurality of mail servers $M_0 \ldots M_n$ that form the server system 104.

Figure 2:
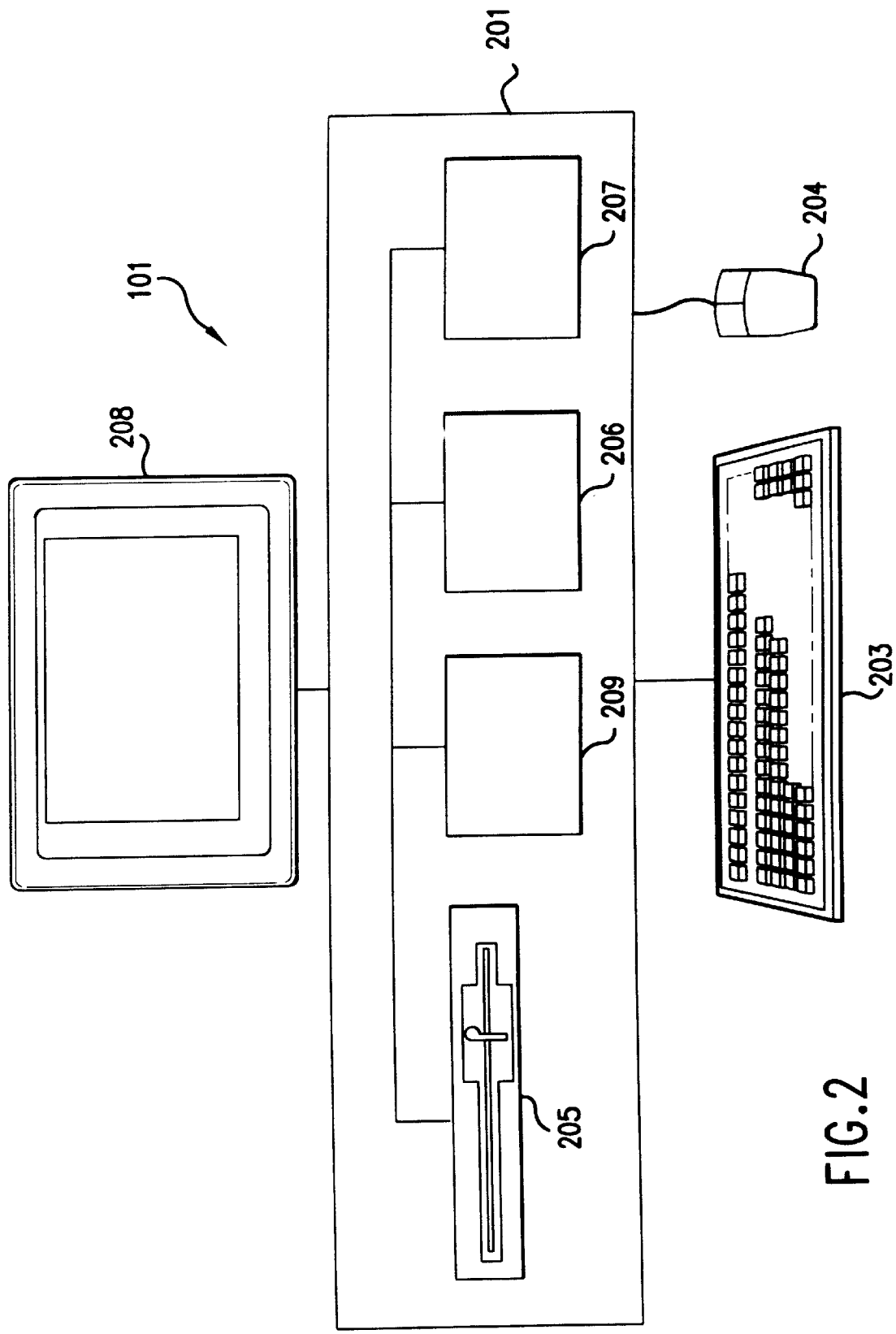
FIG. 2 is a block diagram of exemplary client system hardware which may be used in conjunction with the exemplary e-mail system.

Referring now to FIG. 2, a base unit 201 of the client system 101 includes a central processing unit 209 for executing computer programs and controlling the operation of the client system 101. The base unit 201 also includes a removable storage device drive 205, such as a floppy disk drive, in communication with the central processing unit 209 for reading and writing data and computer programs. A permanent storage device 206 is likewise communicatively connected to the central processing unit 209, and also provides a means for storing computer programs and data. Storage device 206 is ideally a hard disk having a storage capacity of at least twenty (20) megabytes. A dynamic memory device 207 is in communication with the central processing unit 209 for providing temporary storage of computer programs and data.

The client system 101 also has a user interface including a display terminal monitor 208 for displaying graphical and textual information to a user, and input devices such as a keyboard 203 and a mouse 204 permitting the user to communicate with the base unit 201.

Figure 6:
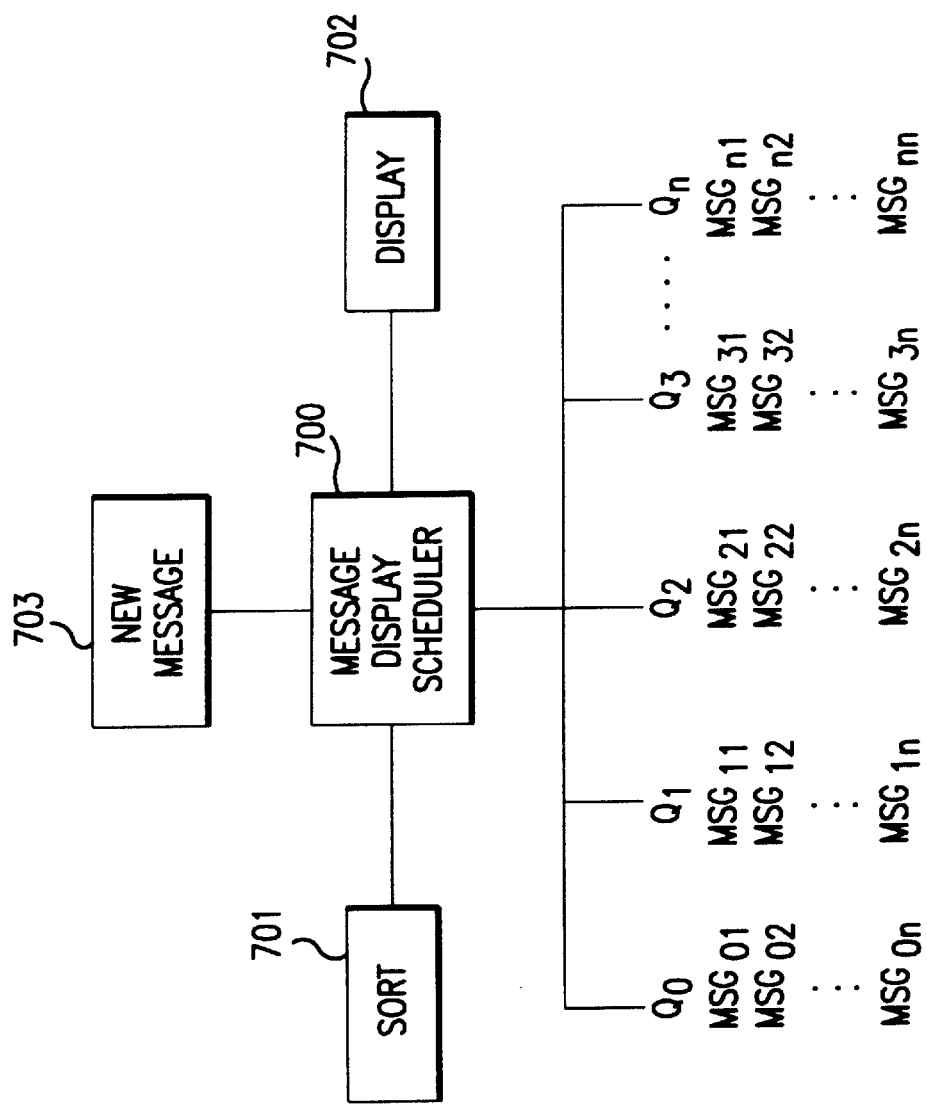
FIG. 6 is a block diagram showing an embodiment of an advertisement display scheduler according to the present invention.

As illustrated in FIG. 6 and explained more fully below, the client system 101 also includes an advertisement display scheduler 700. The advertisement display scheduler 700 can be implemented as a separately-executable software module included in the client system software, and is maintained in the storage device 206 of the client system 101.

Referring again to FIG. 1, the server system 104 communicating with the client system 101 is an electronic mail (e-mail) system which functions as an electronic post office. The server system 104 may receive and deliver e-mail messages addressed to users connected directly or indirectly to it, as well as to non-users through a network 107, such as the Internet. The server system 104 also delivers advertisements for subsequent presentation to the user when the user is not in communication with the server system 104 and/or when information is being transferred between the client system 101 and the server system 104. The server system 104 also includes a plurality of signup servers $S_0 \ldots S_n$ that are used when the user first establishes an account with the server system 104.

As explained in more detail below, in the representative embodiment, the advertisements may be presented to the user as either "banner advertisements" or "showcase advertisements." The presentation of the advertisements is controlled by the advertisement display scheduler 700 configured according to the present invention.

The server system 104 includes a database management system 106 in communication with each of the plurality of mail servers $M_0 \ldots M_n$. The database management system 106 stores various information related to advertisements (e.g., vendor identification, billing information, target demographics), and information regarding system users. The database management system 106 may have a hardware configuration similar to the mail servers $M_0 \ldots M_n$, but ideally includes a plurality of high-capacity storage devices. Alternatively, the database management system 106 may be a distributed system comprising a plurality of file servers, each operating on a hardware configuration similar to that of the mail servers $N_0 \ldots M_n$.

Referring again to FIG. 2, in order to operate the client system 101, a user must first load the client system software onto the client system 101 using, for example, an installation program stored on a floppy disk that is readable by the removable storage device driver 205. Once installed, the user can initiate local execution of the client system software.

The client system software may execute in a GUI environment, such as that provided by Microsoft Windows. In the GUI environment, the user may use the mouse 204 to "click" on an icon representing the client system software, thereby initiating execution.

Presentation of Advertisements

According to an embodiment of the present invention, two types of advertisements are presented to users of the client system 101: banner advertisements and showcase advertisements. The primary vehicle for presenting information, such as advertisements, to users during periods of off-line activity is the banner advertisement. Showcase advertisements are typically used to present information to users while a connection is being established with the server system 104 and while information (including e-mail messages and advertisements) are being transferred between the client computer 101 and the server system 104.

Figure 3:
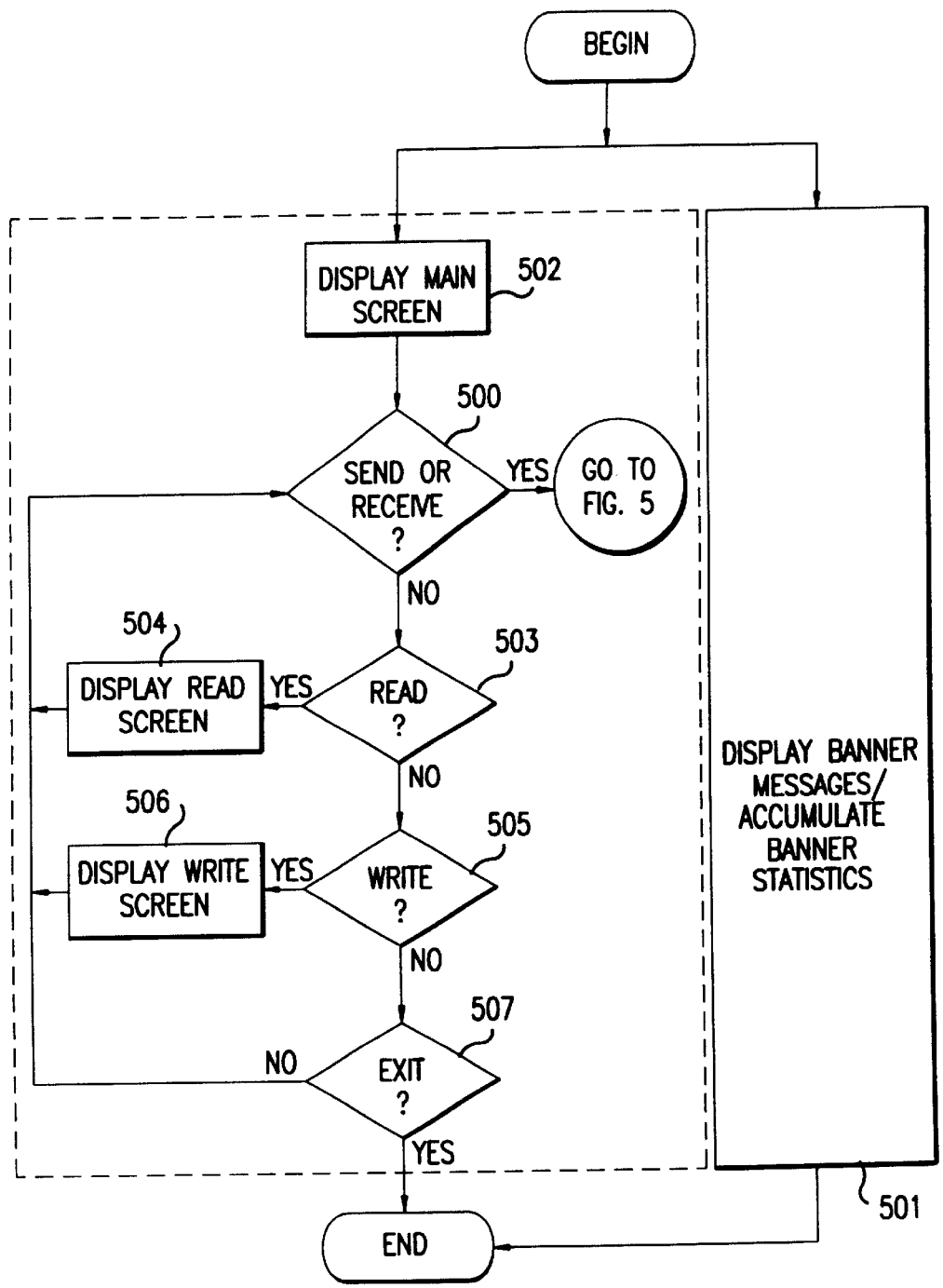
FIG. 3 is a flowchart describing the basic processing of the client system software for the exemplary e-mail system.

The flowchart of FIG. 3 illustrates the basic processing of the client system 101 following completion of installation and initial user setup procedures (e.g., automatic configuration of the user's modem to communicate properly with the server system 104, activation of a new user account, completion of a user profile to provide demographic information for targeted advertising). The client system 101 continuously displays banner advertisements on a predetermined portion of the display terminal monitor 208 concurrently with the operation of the client system (step 501), and records statistical information relating to the display (e.g., what advertisements were shown and for how long). For example, the banner advertisements are displayed whenever the user is using the client system to read or write e-mail messages.

Figure 5:
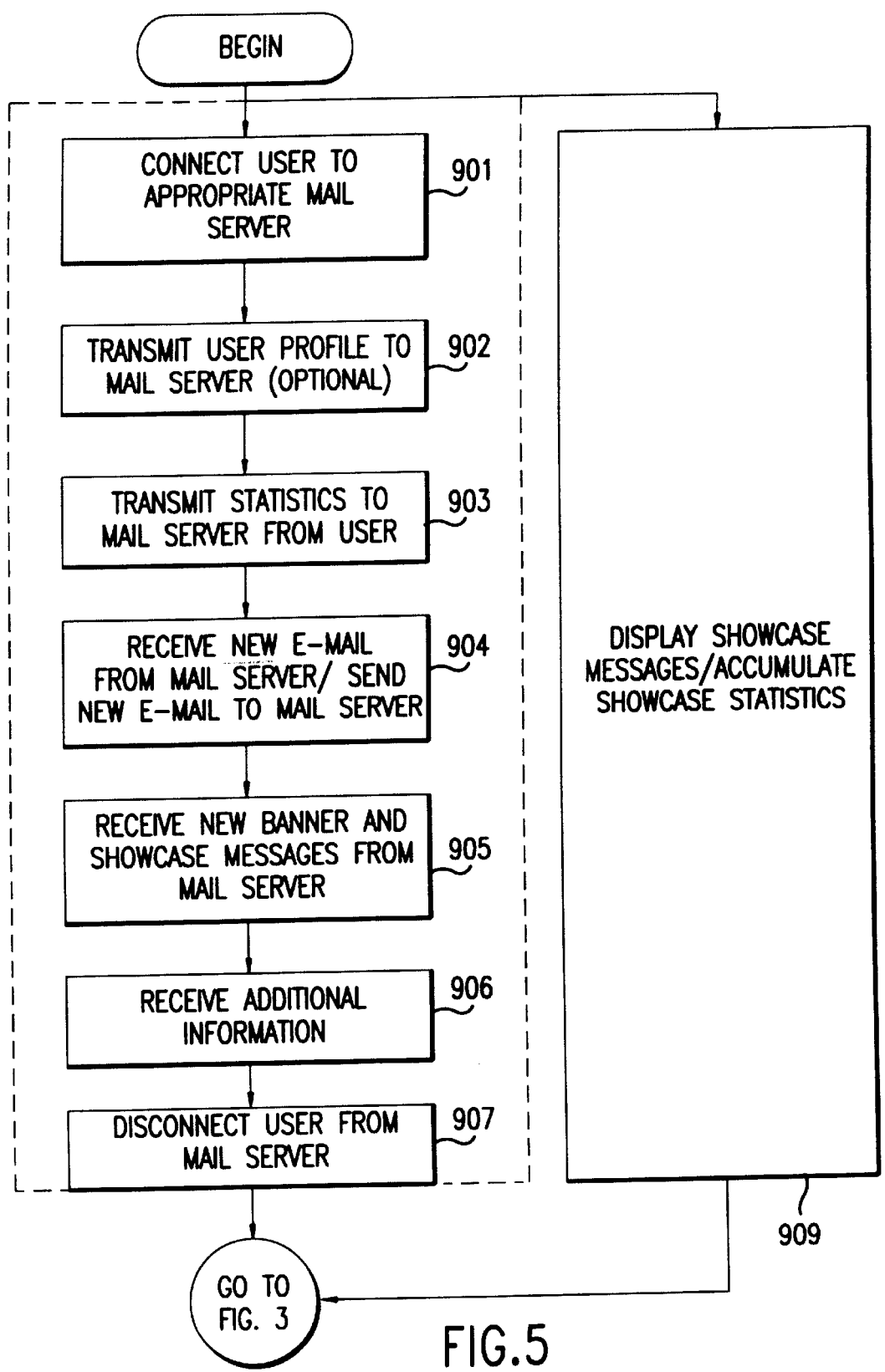
FIG. 5 is a flowchart describing the process by which e-mail is retrieved by the client system of the exemplary e-mail system.

As shown in FIG. 3, which is a flowchart describing the basic processing of the client system software for the exemplary e-mail system, when the process begins, banner messages may be displayed and banner statistics may be accumulated (step 501). The process may also concurrently display a main screen (step 502) and determine if e-mail is to be sent or received (step 500). If e-mail is to be sent or received, the process described in detail with respect to FIG. 5 is performed. If e-mail is not to be sent or received, the process may determine if e-mail is to be read (step 503). If e-mail is to be read, the read screen is displayed (step 504) and the process continues at step 500. If e-mail is not to be read, the process may determine if e-mail is to be written (step 505). If e-mail is to be written, the write screen is displayed (step 506) and the process continues at step 500. If e-mail is not to be written, the process may determine whether to exit (step 507). If the process determines to not exit, the process continues at step 500. If the process determines to exit, the process ends.

Figure 4:
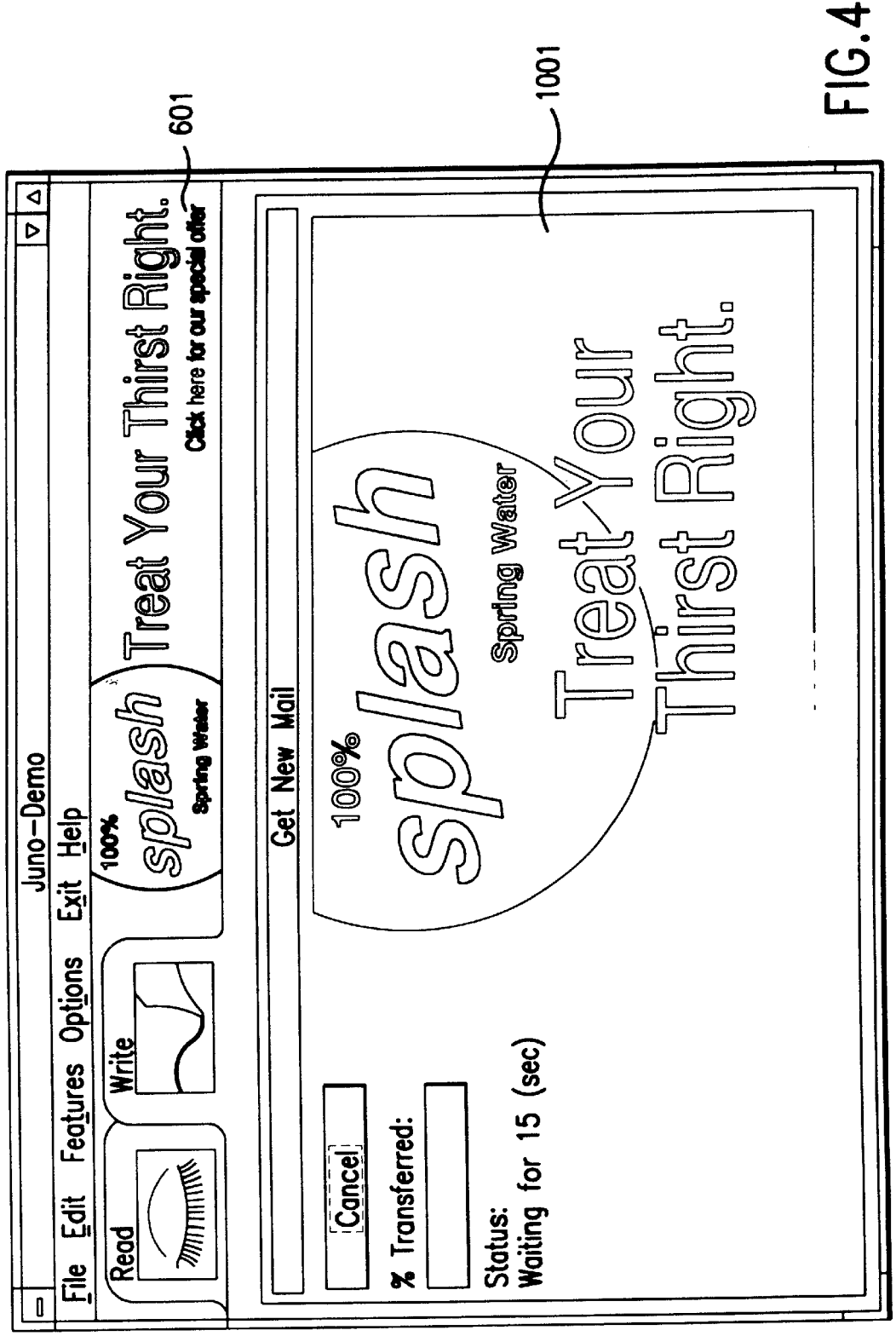
FIG. 4 illustrates a preferred placement of advertisements presented by the advertisement display scheduler of the present invention.

FIG. 4 provides an example of a display terminal monitor 208 showing a banner advertisement 601. The banner advertisement 601 is positioned prominently, but relatively unobtrusively, in the upper right-hand portion of the video display. The banner advertisement 601 can be replaced or updated by another one of a plurality of stored advertisements after a predetermined period of time has elapsed. Replacing the display (or other output) of an advertisement with the display (or other output) of another advertisement can take place while the client computer 101 is not connected to the server system 104. The advertisements that are retrieved from memory of the client computer 101 prior to output.

The banner advertisement 601 may be interactive. For example, by clicking on a specified portion of the banner advertisement 601, the user may be provided with additional information concerning the subject matter of the banner advertisement 601. Likewise, the user may access an e-mail message template including the e-mail address of a vendor associated with the banner advertisement 601 being displayed, so that the user may easily forward comments or requests for additional information. Clicking on the banner advertisement 601 may also cause an e-mail message to be automatically completed (including the message text) and either transmitted immediately to the vendor or stored in an "outbox" for later transmission.

Showcase advertisements 1001 can be displayed in addition to the previously-described banner advertisements 601 during periods of on-line activity; for example, during the entire time that the client system 101 is establishing communications and actually communicating with the server system 104. The flowchart of FIG. 5 illustrates one such period when showcase advertisements are displayed; that is, during performance of a "Get New Mail" function of the client system 101.

As shown in FIG. 5, which is a flowchart describing the process by which e-mail is retrieved by the client system of the exemplary e-mail system, when the process begins, showcase messages may be displayed and showcase statistics may be accumulated (step 909). The process may also concurrently connect a user to an appropriate mail server (step 901). The process may then optionally transmit a user profile to the mail server (step 902) and transmit statistics to the mail server from the user (step 903). The process may also receive new e-mail from the mail server and send new e-mail to the mail server (step 904). In addition, the process may receive new banner and showcase messages from the mail server (step 905) and receive additional information (step 906). Finally, the process may disconnect the user from the mail server (step 907), and the process described in detail with respect to FIG. 3 may be performed.

Referring again to the video display mock-up of FIG. 4, a showcase advertisement 1001 is a relatively large advertisement that can occupy the entire primary operational portion of the video display. Like the banner advertisement 601, the showcase advertisement 1001 can be replaced after a predetermined period of time with a different showcase advertisement.

Schedulers

According to the representative embodiment of the present invention, the client system 101 includes an advertisement display scheduler that controls the display of both the banner advertisements 601 and the showcase advertisements 1001. Referring to FIG. 6, the advertisement display scheduler 700 can be configured as a software module included in the client system software and includes a new advertisement routine 703, a sort routine 701 and a display routine 702. The advertisement display scheduler 700 likewise maintains a plurality of advertisement queues $Q_0 \ldots Q_n$, each of which contains a plurality of advertisements (e.g., $MSG_{01} \ldots MSG_{0n}$). The advertisement queues $Q_0 \ldots Q_n$ can be maintained in the storage device 206.

The advertisement display scheduler 700 receives digital representations of banner advertisements and showcase advertisements from the server system 104. Each advertisement transmitted to the client system 101 includes control information, such as the expiration date for the advertisement and the maximum number of times the advertisement may be shown to a user, along with a priority assigned by the server system (e.g., HIGH, MEDIUM, LOW, NO). Upon receipt of a given advertisement, the advertisement display scheduler 700 assigns the advertisement to one of the plurality of advertisement queues $Q_0 \ldots Q_n$ according to its previously-assigned priority. The advertisement queues $Q_0 \ldots Q_n$ reside in a designated portion of the storage device 206 having a predetermined memory capacity (e.g., 10 MB) which is specifically reserved for storage of advertisements at the time the client system software is installed.

Figure 7:
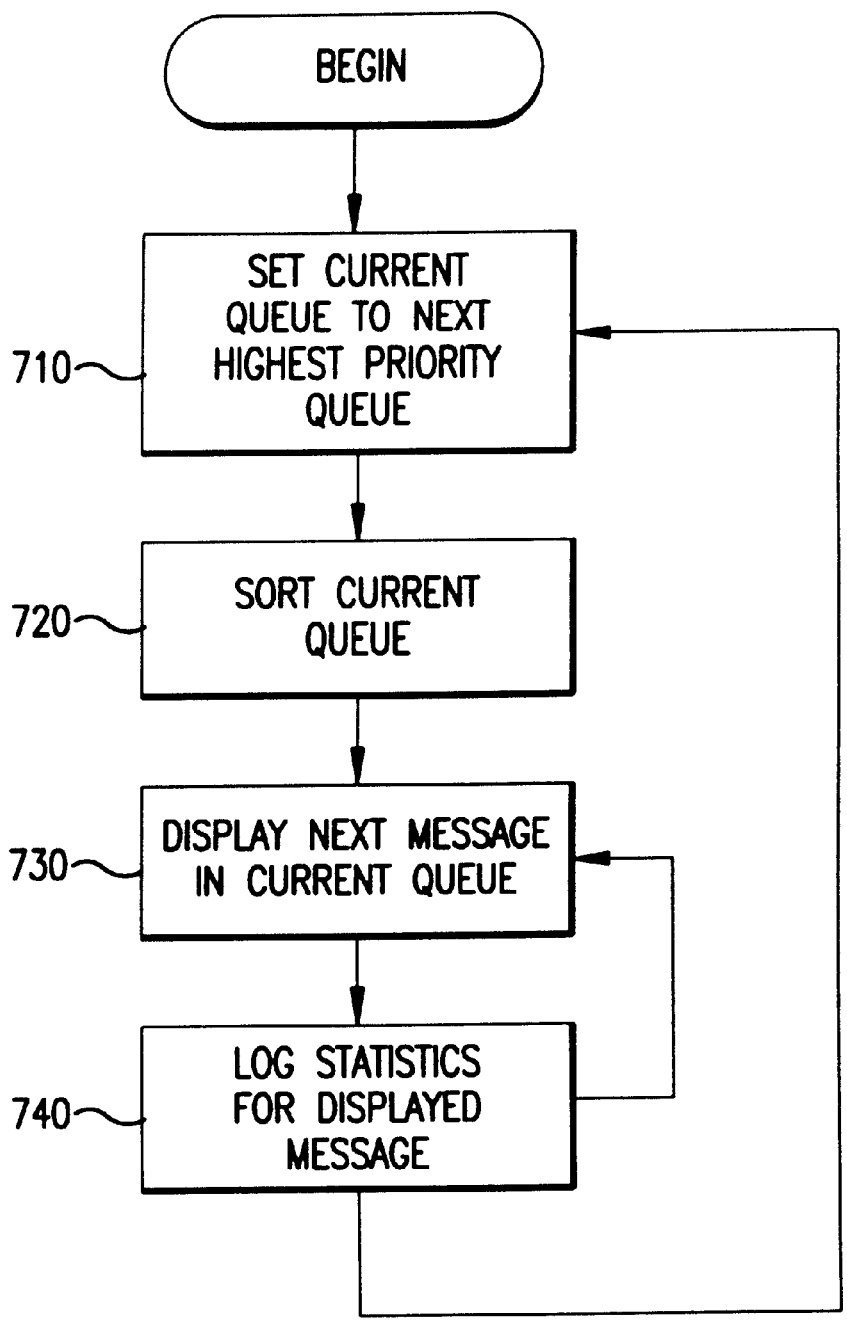
FIG. 7 is a flowchart describing the high-level processing of an embodiment of the advertisement display scheduler of the present invention.

The flowchart of FIG. 7 illustrates the basic processing used by the advertisement display scheduler 700 to determine the order in which advertisements, and particularly banner advertisements, are shown to a system user. The advertisement display scheduler 700 first designates the highest priority advertisement queue (e.g., $Q_0$) as the current advertisement queue (step 710). The sort routine 701 of the advertisement display scheduler 700 then sorts the advertisements in the current queue according to predetermined characteristics of the advertisements, as is more fully described below (step 720).

Once the current advertisement queue is fully sorted, the display routine 702 of the advertisement display scheduler 700 steps through the queue, sequentially presenting each advertisement for a predetermined period of time until all of the advertisements in the current advertisement queue have been shown (step 730), logging statistics with respect to each advertisement actually shown (step 740). The method of displaying information on a video monitor is well-known in the art, and thus is not described herein. When the current advertisement queue has been exhausted, the advertisement display scheduler 700 designates the next-highest priority queue (e.g., $Q_1$) as the current queue and repeats the processing.

In general, the advertisement display scheduler 700 continuously loops through the basic processing illustrated in FIG. 7 as long as the client system 101 is running. When the advertisement display scheduler 700 has completed presenting all of the advertisement in its lowest-priority queue (e.g., $Q_n$), the queue processing simply returns to the beginning and again designates the highest-priority queue as the current advertisement queue.

In a representative embodiment, the advertisement display scheduler 700 monitors the client system 101 for extended periods of inactivity (i.e., the time between key strokes) and "times out" if there is no activity within a predetermined period of time (e.g., five minutes). This is a highly-desirable feature from the standpoint of advertisers, who understandably do not want to be billed for advertisements that are presented on an unattended video display monitor. Conversely, this feature provides advertisers with a relatively high degree of assurance that a user has actually viewed the images presented by the advertisement display scheduler 700.

As noted above, the advertisement display scheduler 700 of the present invention sorts the current advertisement queue according to certain predetermined characteristics of the advertisements contained therein. In the representative embodiment, these characteristics are time to expiration (tte), time since last seen (tsls), maximum exposures (me) and percent remaining exposures (pre); however, other characteristics could similarly be used depending on the requirements of any particular application.

A goal of the sorting process is to maximize the revenue that may be generated from each advertisement given the particular billing arrangements with the associated vendors, subject to a "no starvation" constraint. "Starvation" in this context refers, for example, to an advertisement reaching its expiration date without having reached its maximum number of exposures. (It will be appreciated that there is a cost in transferring advertisements from the server system 104 to client computers 101.) A less lucrative advertisement may be favored over a more lucrative advertisement if that less lucrative advertisement is nearing expiration. Yet another constraint on the sorting process may be that an advertisement nearer to reaching its maximum exposures is favored to make room in the advertisement queues for potentially more-lucrative advertisements.

The advertisement display scheduler 700 may also advantageously facilitate separation of particular advertisements. For example, a given advertisement may have associated with it one or more other advertisements with which it is mutually exclusive (e.g., advertisements relating to competing products of another vendor). In such a case, the advertisement display scheduler 700 may determine the appropriate order for a given advertisement queue and then make a pass through the sorted advertisement queue to eliminate conflicting advertisements. A list of excluded advertisements may be included as part of the scheduling criteria associated with each advertisement. Advertisement separation performed by the advertisement display scheduler 700 may also include a time component. For example, once a first advertisement is output, a second advertisement for a competing produce will not be output for a period of time, e.g., seven days. In the representative embodiment, the period of time for separation is one pass through the advertisement queue. Thus, the period of separation can be determined dynamically based upon the length of time that the user utilizes the system. The process of excluding advertisements from a given queue based upon other advertisements can take place either before or after the sort routine 701.

The sort routine 701 of the advertisement display scheduler determines the order in which the advertisements in the current advertisement queue are presented to a user. The sort routine 701 may employ any suitable technique, such as a queue insert or a bubble sort. Such techniques are well known in the art, and thus are not described in detail herein. Moreover, the present invention does not depend on the use of any particular sorting technique.

Conceptually, the sort routine 701 views the set of possible values for each of the four scheduling criteria (i.e., tte, tsls, me, pre) as defining a four-dimensional space. Each scheduling criterion is associated with a corresponding weighting constant as follows:

$c_1$=TTE_WEIGHT $c_2$=TSLS_WEIGHT $c_3$=TE_WEIGHT $c_4$=PRE_WEIGHT

These constants, which are assigned predetermined values as described below, may then be used to construct a separating hyperplane through the origin defined by the following hyperplane equation:

$$(c_1 * x_1) + (C_2 * x_2) + (c_3 * x_3) + (c_4 * x_4) = 0,$$

where:

$x_1$=tte $x_2$=tsls $X_3$=me $X_4$=pre

The separating hyperplane divides the four-dimensional space into two halves: one half when the first of the two advertisements being sorted should be presented first, and one half when the second of the two advertisements should be presented first. In the representative embodiment, a negative result for the hyperplane equation is arbitrarily defined to mean that the first advertisement should be shown before the second advertisement, and a positive result means the second should be shown before the first. By substituting the delta values computed for $x_1$ through $x_4$ (using the values for each advertisement as maintained by the advertisement display scheduler 700) and the predetermined values for $c_1$ through $c_4$ into the hyperplane equation, it is possible to determine where the total difference between the two advertisements lies with respect to the hyperplane, thus deciding the order in which the advertisements should be presented by the advertisement display scheduler 700.

The values of the four weighting constants ($c_1 \ldots c_4$) orient the separating hyperplane in the four-dimensional space, thus completely determining the behavior of the hyperplane equation and, in turn, the sorting of the current advertisement queue. The signs of the weighting constants play an important role in determining the order in which advertisements are presented. In the representative embodiment, the signs of the weighting constants are set as follows:

| Factor | Sign | Rationale |
| --- | --- | --- |
| TTE_WEIGHT | + | If the first advertisement expires sooner than the second, the delta is negative (i.e., favors the first advertisement). Since it is desirable to complete the maximum exposures before expiration of an advertisement, the sign is not changed. |
| TSLS_WEIGHT | − | If the first advertisement was seen more recently, the delta is negative (i.e., favors the first advertisement). Since it is desirable to present the advertisement which has not been seen recently, the sign of the delta is changed to favor the second advertisement. |
| ME_WEIGHT | + | If the first advertisement has fewer total exposures, the delta is negative (i.e., favors the first advertisement). Since completing all of the exposures of the first advertisement is easier to do because its maximum is lower, presenting the first advertisement will make progress towards moving that advertisement out of the queues. The sign of the delta thus is not changed. |
| PRE_WEIGHT | − | If the first advertisement has fewer remaining exposures in percentage terms, the delta is negative (i.e., favors the first advertisement). Since this means the first advertisement has been shown more often in percentage terms, it is desirable to favor the second advertisement to combat "starvation." |

The sort routine 701 sequentially processes pairs of advertisements in the current advertisement queue. For each pair, the sort routine 701 calculates the delta between the two advertisements for the various scheduling criteria. The deltas are then used to solve the hyperplane equation with the sign of the result determining whether the order of the advertisements should be switched. The sort will continue until a complete pass is made through the current advertisement queue without having to switch the position of any advertisements.

The following example will illustrate the operation of the sorting routine 701 of the advertisement display scheduler 700. Assume the current advertisement queue contains three advertisements ordered as below and having the following characteristics:

| Advertisement | tte | tsls | me | pre |
| --- | --- | --- | --- | --- |
| $MSG_1$ | 5 days | 1 hour | 100 | 40 |
| $MSG_2$ | 10 days | 5 hours | 10 | 90 |
| $MSG_3$ | 1 day | 24 hours | 20 | 50 |

Further assume that the weighting constants have been predefined to have the following values:

| TTE_WEIGHT | ($c_1$) | 8 |
| --- | --- | --- |
| TSLS_WEIGHT | ($c_2$) | −1 |
| ME_WEIGHT | ($c_3$) | 2 |
| PRE_WEIGHT | ($c_4$) | −4 |

On the first pass of the sorting routine 701, $MSG_1$ and $MSG_2$ are compared to determine which should be presented first. Applying the above values for the scheduling criteria, the deltas are calculated as:

$$x_1 = (5 - 10) = -5$$
$$x_2 = (1 - 5) = -4$$
$$x_3 = (100 - 10) = 90$$
$$x_4 = (40 - 90) = -50$$

Inserting these deltas and the weighting constants in the hyperplane equation then yields the following:

$$\begin{aligned} pos &= ((-5) * 8) + ((-4) * (-1)) + (90 * 2) + ((-50) * (-4)) \\ &= (-40) + (4) + (180) + (200) \\ &= 344 \end{aligned}$$

This positive result indicates that $MSG_2$ should be presented first, so the order of $MSG_1$ and $MSG_2$ will be reversed in the current advertisement queue. This reordering is consistent with the rationales expressed above for the signing of the weighting constants, since three of the four criteria favored presenting the second advertisement (here, $MSG_2$) before the first (here, $MSG_1$).

After switching the positions of $MSG_1$ and $MSG_2$, $MSG_2$ will be compared to $MSG_3$ to determine which should be presented first. Applying the same approach, the hyperplane equation yields the following result:

$$\begin{aligned} pos &= (4 * 8) + ((-23) * (-1)) + (80 * 2) + ((-10) * (-4)) \\ &= (32) + (23) + (160) + (40) \\ &= 255 \end{aligned}$$

Once again, the positive result indicates the second advertisement (here, $MSG_3$) should be presented before the first advertisement (here, $MSG_1$). The position of the two advertisements will therefore be swapped in the current advertisement queue.

Thus, after the first pass of the sorting routine 701, the current advertisement queue appears as follows:

| Advertisement | tte | tsls | me | pre |
|---|---|---|---|---|
| $MSG_2$ | 10 days | 5 hours | 10 | 90 |
| $MSG_3$ | 1 day | 24 hours | 20 | 50 |
| $MSG_1$ | 5 days | 1 hour | 100 | 40 |

The sort routine 701 will continue making passes through the current advertisement queue until a complete pass is made where it is not necessary to swap any two advertisements. Thus, at the completion of the sort routine's processing, the advertisements in the current advertisement queue will appear in the optimal order in which they should be presented to a user. Once again, it should be noted that the foregoing is offered merely by way of example; the present invention does not rely on any particular sorting technique.

As the foregoing example demonstrates, the values assigned to the weighting constants (i.e., $c_0$–$c_4$) significantly impact the ultimate ordering of the advertisements. It has been found to be advantageous to designate one of the weighting constants (e.g., $c_2$) as a numeraire and set its value to "1". The other weighting constants may then be assigned exponentially increasing values based on their perceived importance. In this way, the most important scheduling criteria will have a proportionately greater impact on the ultimate ordering of the advertisements.

The particular values used in the representative embodiment were chosen to increase the probability of completing the maximum exposures for a given advertisement prior to the time the advertisement expires, thereby maximizing the revenue earned from the vendor who commissioned the advertisement. In effect, the advertisement display scheduler functions like a shortest-time-to-completion/first scheduled operating system. Persons skilled in the art will recognize, however, that other values may be equally or better suited for a given application in view of the particular characteristics of the advertisements, vendor requirements and billing considerations.

In the representative embodiment, the advertisement display scheduler 700 will continue to schedule a given advertisement until the advertisement is "expired" (i.e., its expiration date is passed) or is "exhausted" (i.e., its maximum exposures for the user are reached). In either case, the advertisement display scheduler 700 will remove the advertisement from its advertisement queue.

As noted above, the advertisement display scheduler 700 of the present invention may maintain a plurality of prioritized advertisement queues, including HIGH, MEDIUM, LOW and NO priority queues. In the event that none of the so-called "normal" priority queues (i.e., HIGH, MEDIUM and LOW) contains an advertisement, either because no advertisements have been received from the server system 104 or because all of the advertisements have expired or exhausted, the advertisement display scheduler 700 will sort and present advertisements from the NO_PRIORITY queue until a normal priority advertisement is received. The NO_PRIORITY queue can contain things like public service advertisements and the corporate logo of the e-mail service provider.

Once a normal priority advertisement is received by the advertisement display scheduler 700, that advertisement will generally be scheduled next and the NO_PRIORITY queue will not be returned to until the normal priority advertisement becomes expired or exhausted. Nevertheless, to avoid showing the same advertisement in succession when there is only one normal priority advertisement in the queues, the advertisement display scheduler 700 may show an advertisement from the NO_PRIORITY queue between two showings of the same single normal priority advertisement. In the event there are no advertisements remaining in any of the advertisement queues, including the NO_PRIORITY queue, the advertisement display scheduler may display a white background or some default advertisement.

Receiving Advertisements

In general, the advertisement display scheduler 700 of the present invention receives all of the advertisements it will show from the server system 104. For example, the server system 104 may transmit new banner advertisements and/or showcase advertisements to the client system 101 when a user goes on-line to retrieve e-mail messages as illustrated in FIG. 5. An initial set of advertisements may also be loaded along with the client system software to ensure that the user is shown advertisements even before the user goes on-line for the first time.

Advertisements may be transmitted according to any known data transfer technique and in any format, e.g., as bit map images. New advertisements are written to the storage device 206 and are processed by the new advertisement routine 703 of the advertisement display scheduler 700. In addition to display information, a new advertisement will include scheduling information such as its priority (e.g., HIGH, MEDIUM, LOW, NO), the maximum number of times the advertisement should be presented, and its expiration date. In the representative embodiment, advertisements are transferred to and stored at the client computer 101 in the form of advertisement archives. Each advertisement archive comprises information used to output an advertisement (e.g., bitmap information, position information, MPEG information, MIDI information, etc.) and advertisement control information. The advertisement control information for each advertisement includes information such as its priority (e.g., HIGH, MEDIUM, LOW, NO), the maximum number of times the advertisement should be presented, and its expiration date, and other parameters that can be used to control the scheduling of the output of advertisements. Each advertisement archive can also include an identification number or code for the advertisement.

FIG. 8 illustrates the information that may be communicated between the client system 101 and the server system 104 in an embodiment of the present invention. The server system 104 may receive advertisements from an advertiser 108.

When a normal priority advertisement is received during processing of a normal priority queue, the advertisement display scheduler will determine whether the new advertisement belongs in the current advertisement queue (i.e., if its priority matches the queue's priority). If so, the new advertisement routine 703 determines where in the current advertisement queue the new advertisement belongs. Starting with the advertisement immediately following the current advertisement, the new advertisement is sequentially compared with each advertisement in the current advertisement queue until one is found which the new advertisement should come before. The new advertisement routine 703 may invoke the sort routine 701 to accomplish this comparison using the above-described hyperplane equation, as described above. The new advertisement is then inserted into the current advertisement queue immediately before that advertisement. In effect, one round of the insertion sort is conducted to ensure that the portion of the current advertisement queue following the current advertisement remains sorted even after insertion of a new advertisement.

If a newly-received advertisement does not belong in the current advertisement queue, the new advertisement routine 703 simply inserts the advertisement at the bottom of the appropriate advertisement queue. The new advertisement will thus be sorted along with the other advertisements when that advertisement queue becomes the current advertisement queue.

If the newly-received advertisement is a "NO" priority advertisement, it is simply inserted at the end of the NO_PRIORITY queue even if that queue is the current advertisement queue and the sorting routine 701 is not invoked. Since these advertisements do not generate revenue for the e-mail service provider, it is relatively unimportant whether such advertisements are shown in exactly the right order every time the NO_PRIORITY queue is processed.

Logging Statistical Information

The advertisement display scheduler 700 can maintain statistics regarding each advertisement that it presents to a user. These statistics are kept in a statistics log file stored on the storage device 206 of the client system 101. Each time a new banner advertisement is displayed, for example, the advertisement display scheduler 700 updates the statistics log file with the identification of the banner advertisement, the time and date it was displayed, and the duration of the display. This information is then used by the advertisement display scheduler 700 in determining which advertisements to display subsequently, and can be used by the server system 104 for billing and reporting purposes. This information can also be used at the server system 104 by the advertisement distribution scheduler and the advertisement download scheduler. Similar statistics are maintained with respect to the presentation of showcase advertisements. The advertisement display scheduler 700 also can maintain an event log file containing information about various system activity including, for example, actions taken by the user (i.e., "clicking" on an advertisement), timeouts, and so on. Moreover, the server system 104 may send billing information and statistics to the advertiser 108.

It will be appreciated that advertisements may also include community service messages, system information messages, colorful and pleasing artwork, photographic works, logos, slogans and the like. The term advertisement includes content that is other than e-mail messages to and from users of the e-mail system. Advertisements can include text, graphics, sound, animations, video, etc. Thus, it will be appreciated that the advertisement display scheduler 700 can be used to schedule the output of these formats of advertisements.

The advertisement distribution scheduler is located at the server system 104. The advertisement distribution scheduler generates an assignment of advertisements to users and their computers. For example, a particular advertisement for orange juice may be assigned by the advertisement distribution scheduler to all residents of New York City and all college students in Boston.

Each advertisement has associated with it an ad contract which specifies a demographic profile reach and frequency, duration and time of expiry for the advertisement. The ad contract can be stored in the database management system 106. Using the information about each user received by the server system 104, the advertisement distribution scheduler assigns advertisements to users. In the representative embodiment, the advertisement distribution scheduler uses information received from the user via the member profile that is stored in the database management system 106 to allocated advertisements. Demographic information collected from other sources can also be used by the advertisement distribution scheduler. Thus, the advertisement distribution scheduler runs database selects on the user demographic information stored in the database management system 106 to produce a list of users for each advertisement.

The advertisement distribution scheduler includes additional functionality that assists in the maximization of advertisement revenues and the minimization of system costs. For example, for each selected user, the advertisement distribution scheduler reviews (1) the usage profile of the user (e.g., statistical information collected in the statistics log file at the user's computer 101) to ascertain expected advertisement consumption over a predetermined period; and (2) the current advertisement load of the user and time to expiry. Thus, advertisements can be allocated to users who are more likely to be exposed to the advertisements prior to the expiration period of the advertisement.

Thus, given an ad contract, the advertisement distribution scheduler computes a set of assignments of advertisements to users that maximizes potential revenues. Because more than one user may operate a particular client system 101 (e.g., members of a family, employees of a corporation), allocation of advertisements can be aggregated for each client system 101 so that an advertisement need only be transferred once to a client system 101 if more than one user at that client system 101 has been allocated the advertisement. The advertisement distribution scheduler generates an advertisement archive for each client system 101. The advertisement archive can be stored (directly or indirectly) on the mail server $M_0 \ldots M_n$ assigned to that client system 101.

Optionally, the advertisement distribution scheduler can assign advertisements to users on a machine basis rather than a user basis. Thus, the usage profile and current advertisement load discussed above can be aggregated and considered by the advertisement distribution scheduler on a per machine rather than per user basis.

The advertisement download scheduler is located at the server system 104. The advertisement download scheduler controls the transfer of advertisements from a mail server $M_n$ to a client system 101. At any moment in time, each client system 101 has a given number of advertisements that actually have been downloaded to the client system 101 and a given number of advertisement eligible for download (as determined by the advertisement distribution scheduler) that are stored on a mail server $M_n$. Upon any given connection between the client system 101 and the server system 104, the advertisement download scheduler decides which of the advertisements (e.g., the advertisement archives) that are stored on the mail server $M_n$, if any, are actually downloaded at that time.

The advertisement download scheduler aims to maximize revenue by optimizing for the number of exposures of an advertisement before expiry of that advertisement. For example, it may not be optimal to download an advertisement one day before expiry if another advertisement can be downloaded that has a week until expiry or to download an advertisement if the user has previously received but not been exposed to many current advertisements. The advertisement download scheduler also aims to spread the advertisement load over all users of a given client system 101.

The advertisement download scheduler delivers advertisements in a timely fashion without overloading any given user, but in a way that maximizes the number of exposures an advertisement can receive before it expires. It is noted that it may be suboptimal to download an advertisement with a large amount of time remaining for its delivery by the advertisement display scheduler 700.

Moreover, the advertisement download scheduler will aim to spread downloading of advertisements during any one connection between the client system 101 and the server system 104. Thus, it is believed preferable to have one advertisement transferred each connection, rather than having four advertisements transferred in a first connection and none in a subsequent three connections. A parameter used in this decision process can also include the number of e-mail messages to be transferred and the transfer time.

In the representative embodiment, each advertisement has associated with it scheduling information that can be used by the advertisement download scheduler to make decisions as to the order and timing of the download of eligible advertisements.

For a given advertisement load assigned to a particular client system 101, the advertisement download scheduler determines which advertisements should be downloaded in an expected time period (e.g., the next week) and determines the fraction for the given connection based on the percentage of connect time that the current user represents according to historical information about that user's habits (e.g., as stored in the database management system 106). This spreading attempts to share the burden of advertisement downloading amongst all users of a particular client system 101.

The three schedulers of the present invention operate together in an integrated fashion to maximize exposures of relevant advertisements and to minimize system operation costs.

The present invention has been described in the context of a representative embodiment in which users received e-mail service in exchange for being exposed to vendor advertising. Persons skilled in the art will recognize, however, that the present invention is applicable to any system in which it is desirable to present computer users with a continuously-changing variety of advertisements, particularly while the user is operating the computer that is not connected to a remote server. The principles of the present invention apply to on-line services that present advertising to users while the user is accessing other content. Thus, an e-mail message may be regarded as an example of content provided to a user.

Moreover, while the present invention has been described with reference to representative embodiments having specific features, persons skilled in the art will recognize that many modifications and variations are possible. Accordingly, the present invention embraces all alternatives, modifications and variations that fall within the spirit and scope of the appended claims, as well as all equivalents thereof.

What is claimed is:

1. An advertising system for displaying advertisements to users in conjunction with a network, the advertising system comprising
    plural client systems, each comprising
        a display
        a first processor
        a first memory coupled to the first processor
        a first communications interface for interfacing the client system with a network
        a first communications module comprising computer readable instructions for causing data to be transmitted and received via the communications interface
        a first computer program comprising computer readable instructions for causing the first processor to
            receive a plurality of advertisements through the first communications interface, wherein the advertisements are selected outside of the user's control
            store the advertisements in the first memory
            receive priority information for the advertisements, the priority information comprising relative priorities for display of the advertisements
            store the priority information in the first memory
            set a sequential order for displaying the advertisements according to the priority information
            store the order for displaying the advertisements in the first memory
            automatically display the advertisements in the stored order on the display
    a server system comprising
        a second processor
        a second memory coupled to the second processor
        a second communications interface for interfacing the server system with the network
        a second communications module comprising computer readable instructions for causing data to be transmitted and received via the second communications interface
        a second computer program comprising computer readable instructions for causing the second processor to
            receive contract information for the advertisements, wherein the contact information comprises demographic profile reach and frequency, duration and time of expiry
            store the contract information in the second memory
            receive demographic information about the users of the client systems
            store the demographic information in the second memory
            select advertisements for the client systems to display based upon matches between the contract information and the demographic information
            store the selections in the second memory
            using an expected advertisement consumption for each user, and a current advertisement load and time to expiry for each user, allocate the selected advertisements to users who are more likely to be exposed to the advertisements prior to the advertisements' respective time of expiry
            store the allocations in the second memory.

2. The advertising system for displaying advertisements to users of claim 1, wherein
    the instructions for causing the first processor to set a sequential order comprise instructions for causing the first processor to assign each advertisement to one of a plurality of queues, the queues corresponding to the priorities, wherein advertisements having the same priority are stored in the same queue
    the instructions for causing the first processor to display the advertisements comprise instructions for causing the first processor to display advertisements assigned to highest priority queues prior to displaying advertisements assigned to lower priority queues.

3. The advertising system for displaying advertisements to users of claim 2, wherein the instructions for causing the first processor to display the advertisements further comprise instructions for causing the first processor to cycle back to the highest priority queue after displaying all of the advertisements assigned to the lowest priority queue.

4. The advertising system for displaying advertisements to uses of claim 1
    wherein the priority information includes scheduling information for the advertisements, the scheduling information including an expiration date after which the respective advertisement should not be displayed wherein the instructions for setting a sequential order comprise instructions for setting advertisements which will expire soon before advertisements which will expire later.

5. The advertising system for displaying advertisements to users of claim 1
wherein the priority information includes exhaustion information, the exhaustion information including a number of times to display each advertisement
wherein the instructions for setting a sequential order comprise instructions for setting advertisements which have more times to be displayed before advertisements which have fewer times to be displayed.

6. The advertising system for displaying advertisements to users of claim 1
wherein the priority information includes revenue enhancement information, the revenue enhancement information comprising a benefit for displaying each advertisement
wherein the instructions for setting a sequential order comprise instructions for setting advertisements which have a greater benefit for display before advertisements which have lesser benefit for display.

7. The advertising system for displaying advertisements to users of claim 1, wherein the second computer program further comprises computer readable instructions for causing the second processor to determine an order and timing for sending the allocated advertisements to a given client system.

8. The advertising system for displaying advertisements to users of claim 7, wherein the instructions for causing the second processor to determine an order and timing for sending the allocated advertisements comprise instructions for causing the second processor to optimize for maximum revenue based upon the contract information.

9. The advertising system for displaying advertisements to users of claim 7, wherein the instructions for causing the second processor to determine an order and timing for sending the allocated advertisements comprise instructions for causing the second processor to spread downloading of advertisements across plural connections between the client system and a source of the advertisements.

10. The advertising system for displaying advertisements to users of claim 9, wherein the source of the advertisements is the server system.

11. The advertising system for displaying advertisements to users of claim 1, wherein the second computer program further comprises computer readable instructions for causing the second processor to aggregate allocations of advertisements such that advertisements allocated to multiple users of the same client system will be transmitted only once to the client system.

12. The advertising system for displaying advertisements to users of claim 1, wherein the second computer program further comprises computer readable instructions for causing the second processor to archive the advertisement allocations for each client system.

13. The advertising system for displaying advertisements to users of claim 1, wherein the instructions for causing the first processor to set a sequential order for displaying the advertisements according to the priority information comprise instructions for causing the first processor to calculate a set of delta values representing differences between scheduling parameters of a first advertisement and corresponding scheduling parameters of a second advertisement.

14. The advertising system for displaying advertisements to users of claim 13, wherein the instructions for causing the first processor to set a sequential order further comprise instructions for causing the first processor to solve a hyperplane equation using the set of delta values and a corresponding set of scheduling constants to identify which of the first and second advertisements has a higher priority.

15. A client system for communicating with a network and displaying advertisements to a user of the client system, the network including servers storing advertisements, the client system comprising
a display
a processor
a memory coupled to the processor
a communications interface for interfacing the client system with a network
a communications module comprising computer readable instructions for causing data to be transmitted and received via the communications interface
a computer program comprising computer readable instructions for causing the processor to
receive a plurality of advertisements through the communications interface, wherein the advertisements are selected outside of the user's control
store the advertisements in the memory
receive priority information for the advertisements, the priority information comprising relative priorities for display of the advertisements
store the priority information in the memory
set a sequential order for displaying the advertisements according to the priority information
store the order for displaying the advertisements in the memory
automatically display the advertisements in the stored order on the display.

16. The client system for communicating with a network and displaying advertisements to a user of the client system of claim 15, wherein
the instructions for causing the processor to set a sequential order comprise instructions for causing the processor to assign each advertisement to one of a plurality of queues, the queues corresponding to the priorities, wherein advertisements having the same priority are stored in the same queue
the instructions for causing the processor to display the advertisements comprise instructions for causing the processor to display advertisements assigned to highest priority queues prior to displaying advertisements assigned to lower priority queues.

17. The client system for communicating with a network and displaying advertisements to a user of the client system of claim 16, wherein the instructions for causing the processor to display the advertisements further comprise instructions for causing the processor to cycle back to the highest priority queue after displaying all of the advertisements assigned to the lowest priority queue.

18. The client system for communicating with a network and displaying advertisements to a user of the client system of claim 15
wherein the priority information includes scheduling information for the advertisements, the scheduling information including an expiration date after which the respective advertisement should not be displayed
wherein the instructions for setting a sequential order comprise instructions for setting advertisements which will expire soon before advertisements which will expire later.

19. The client system for communicating with a network and displaying advertisements to a user of the client system of claim 15
   wherein the priority information includes exhaustion information, the exhaustion information including a number of times to display each advertisement
   wherein the instructions for setting a sequential order comprise instructions for setting advertisements which have more times to be displayed before advertisements which have fewer times to be displayed.

20. The client system for communicating with a network and displaying advertisements to a user of the client system of claim 15
   wherein the priority information includes revenue enhancement information, the revenue enhancement information comprising a benefit for displaying each advertisement
   wherein the instructions for setting a sequential order comprise instructions for setting advertisements which have a greater benefit for display before advertisements which have lesser benefit for display.

21. The client system for communicating with a network and displaying advertisements to a user of the client system of claim 15, wherein the instructions for causing the processor to set a sequential order for displaying the advertisements according to the priority information comprise instructions for causing the processor to calculate a set of delta values representing differences between scheduling parameters of a first advertisement and corresponding scheduling parameters of a second advertisement.

22. The client system for communicating with a network and displaying advertisements to a user of the client system of claim 21, wherein the instructions for causing the processor to set a sequential order further comprise instructions for causing the processor to solve a hyperplane equation using the set of delta values and a corresponding set of scheduling constants to identify which of the first and second advertisements has a higher priority.

23. A server system for selecting advertisements for client systems to download and for providing advertisement display information to the client systems via a network, the server system comprising
   a processor
   a memory coupled to the processor
   a communications interface for interfacing the server system with the network
   a communications module comprising computer readable instructions for causing data to be transmitted and received via the communications interface
   a computer program comprising computer readable instructions for causing the processor to
     receive contract information for a plurality of advertisements, wherein the contract information comprises demographic profile reach and frequency, duration and time of expiry
     store the contract information in the memory
     receive demographic information about a plurality of users of the client systems
     store the demographic information in the memory
     select advertisements for the client systems to display based upon matches between the contract information and the demographic information
     store the selections in the memory
     using an expected advertisement consumption for each user, and a current advertisement load and time to expiry for each user, allocate the selected advertisements to users who are more likely to be exposed to the advertisements prior to the advertisements' respective time of expiry
     store the allocations in the memory.

24. The server system for selecting advertisements for client systems to download and for providing advertisement display information to the client systems via a network of claim 23, wherein the computer program further comprises computer readable instructions for causing the processor to determine an order and timing for sending the allocated advertisements to a given client system.

25. The server system for selecting advertisements for client systems to download and for providing advertisement display information to the client systems via a network of claim 23, wherein the instructions for causing the processor to determine an order and timing for sending the allocated advertisements comprise instructions for causing the processor to optimize for maximum revenue based upon the contract information.

26. The server system for selecting advertisements for client systems to download and for providing advertisement display information to the client systems via a network of claim 23, wherein the instructions for causing the processor to determine an order and timing for sending the allocated advertisements comprise instructions for causing the processor to spread downloading of advertisements across plural connections between the client system and a source of the advertisements.

27. The server system for selecting advertisements for client systems to download and for providing advertisement display information to the client systems via a network of claim 26, wherein the source of the advertisements is the server system.

28. The server system for selecting advertisements for client systems to download and for providing advertisement display information to the client systems via a network of claim 23, wherein the computer program further comprises computer readable instructions for causing the processor to aggregate allocations of advertisements such that advertisements allocated to multiple users of the same client system will be transmitted only once to the client system.

29. The server system for selecting advertisements for client systems to download and for providing advertisement display information to the client systems via a network of claim 23, wherein the computer program further comprises computer readable instructions for causing the processor to archive the advertisement allocations for each client system.

30. A computer program for use in a client system, the client system for communicating with a network and displaying advertisements to a user of the client system, the network including servers storing advertisements, the client system comprising a display, a processor, and a memory coupled to the processor, the computer program comprising computer readable instructions for causing the processor to
   receive a plurality of advertisements, wherein the advertisements are selected outside of the user's control
   store the advertisements in the memory
   receive priority information for the advertisements, the priority information comp-sing relative priorities for display of the advertisements
   store the priority information in the memory
   set a sequential order for displaying the advertisements according to the priority information
   store the order for displaying the advertisements in the memory
   automatically display the advertisements in the stored order on the display.

31. The computer program for use in a client system of claim 30, wherein
the instructions for causing the processor to set a sequential order comprises instructions for causing the processor to assign each advertisement to one of a plurality of queues, the queues corresponding to the priorities, wherein advertisements having the same priority are stored in the same queue
the instructions for causing the processor to display the advertisements comprises instructions for causing the processor to display advertisements assigned to highest priority queues prior to displaying advertisements assigned to lower priority queues.

32. The computer program for use in a client system of claim 31, wherein the instructions for causing the processor to display the advertisements further comprises instructions for causing the processor to cycle back to the highest priority queue after displaying all of the advertisements assigned to the lowest priority queue.

33. The computer program for use in a client system of claim 30
wherein the priority information includes scheduling information for the advertisements, the scheduling information including an expiration date after which the respective advertisement should not be displayed
wherein the instructions for setting a sequential order comprise instructions for setting advertisements which will expire soon before advertisements which will expire later.

34. The computer program for use in a client system of claim 30
wherein the priority information includes exhaustion information, the exhaustion information including a number of times to display each advertisement
wherein the instructions for setting a sequential order comprise instructions for setting advertisements which have more times to be displayed before advertisements which have fewer times to be displayed.

35. The computer program for use in a client system of claim 30
wherein the priority information includes revenue enhancement information, the revenue enhancement information comprising a benefit for displaying each advertisement
wherein the instructions for setting a sequential order comprise instructions for setting advertisements which have a greater benefit for display before advertisements which have lesser benefit for display.

36. The computer program for use in a client system of claim 30, wherein the instructions for causing the processor to set a sequential order for displaying the advertisements according to the priority information comprise instructions for causing the processor to calculate a set of delta values representing differences between scheduling parameters of a first advertisement and corresponding scheduling parameters of a second advertisement.

37. The computer program for use in a client system of claim 36, wherein the instructions for causing the processor to set a sequential order further comprise instructions for causing the processor to solve a hyperplane equation using the set of delta values and a corresponding set of scheduling constants to identify which of the first and second advertisements has a higher priority.

38. A computer program for use in a server system, the server system for selecting advertisements for client systems to download and for providing advertisement display information to the client systems via a network, the server system comprising a processor and a memory coupled to the processor; the computer program comprising computer readable instructions for causing the processor to
receive contract information for a plurality of advertisements, wherein the contract information comprises demographic profile reach and frequency, duration and time of expiry
store the contract information in the memory
receive demographic information about a plurality of users of the client systems
store the demographic information in the memory
select advertisements for the client systems to display based upon matches between the contract information and the demographic information
store the selections in the memory
using an expected advertisement consumption for each user, and a current advertisement load and time to expiry for each user, allocate the selected advertisements to users who are more likely to be exposed to the advertisements prior to the advertisements' respective time of expiry
store the allocations in the memory.

39. The computer program for use in a server system of claim 38, wherein the computer program farther comprises computer readable instructions for causing the processor to determine an order and timing for sending the allocated advertisements to a given client system.

40. The computer program for use in a server system of claim 39, wherein the instructions for causing the processor to determine an order and tiring for sending the allocated advertisements comprise instructions for causing the processor to optimize for maximum revenue based upon the contract information.

41. The computer program for use in a server system of claim 39, wherein the instructions for causing the processor to determine an order and timing for sending the allocated advertisements comprise instructions for causing the processor to spread downloading of advertisements across plural connections between the client system and a source of the advertisements.

42. The computer program for use in a server system of claim 41, wherein the source of the advertisements is the server system.

43. The computer program for use in a server system of claim 38, wherein the computer program further comprises computer readable instructions for causing the processor to aggregate allocations of advertisements such that advertisements allocated to multiple users of the same client system will be transmitted only once to the client system.

44. The computer program for use in a server system of claim 38, wherein the computer program further comprises computer readable instructions for causing the processor to archive the advertisement allocations for each client system.

45. A client system for communicating with a network and displaying advertisements to a user of the client system, the network including servers storing advertisements, the client system comprising
a display
a processor
a memory coupled to the processor
a communications interface for interfacing the client system with a network
a communications module comprising computer readable instructions for causing data to be transmitted and received via the communications interface means for receiving a plurality of advertisements through the communications interface, wherein the advertisements are selected outside of the user's control means for storing the advertisements in the memory means for receiving priority information for the advertisements, the priority information comprising relative priorities for display of the advertisements means for storing the priority information in the memory means for setting a sequential order for displaying the advertisements according to the priority information means for storing the order for displaying the advertisements in the memory means for automatically displaying the advertisements in the stored order on the display.

46. The client system for communicating with a network and displaying advertisements to a user of the client system of claim 45, wherein the means for setting a sequential order comprises means for assigning each advertisement to one of a plurality of queues, the queues corresponding to the priorities, wherein advertisements having the same priority arm stored in the same queue the means for displaying the advertisements comprises means for displaying advertisements assigned to highest priority queues prior to displaying advertisements assigned to lower priority queues.

47. The client system for communicating with a network and displaying advertisements to a user of the client system of claim 46, wherein the means for displaying the advertisements further comprises means for cycling back to the highest priority queue after displaying all of the advertisements assigned to the lowest priority queue.

48. The client system for communicating with a network and displaying advertisements to a user of the client system of claim 45 wherein the priority information includes scheduling information for the advertisements, the scheduling information including an expiration date after which the respective advertisement should not be displayed wherein the means for setting a sequential order comprises means for setting advertisements which will expire soon before advertisements which will expire later.

49. The client system for communicating with a network and displaying advertisements to a user of the client system of claim 45 wherein the priority information includes exhaustion information, the exhaustion information including a number of times, to display each advertisement wherein the means for setting a sequential order comprises means for setting advertisements which have more times to be displayed before advertisements which have fewer times to be displayed.

50. The client system for communicating with a network and displaying advertisements to a user of the client system of claim 45 wherein the priority information includes revenue enhancement information, the revenue enhancement information comprising a benefit for displaying each advertisement wherein the means for setting a sequential order comprises means for setting advertisements which have a greater benefit for display before advertisements which have lesser benefit for display.

51. The client system for communicating with a network and displaying advertisements to a user of the client system of claim 45, wherein the means for setting a sequential order for displaying the advertisements according to the priority information comprises means for calculating a set of delta values representing differences between scheduling parameters of a first advertisement and corresponding scheduling parameters of a second advertisement.

52. The client system for communicating with a network and displaying advertisements to a user of the client system of claim 51, wherein the means for setting a sequential order further comprises means for solving a hyperplane equation using the set of delta values and a corresponding set of scheduling constants to identify which of the first and second advertisements has a higher priority.

53. A server system for selecting advertisements for client systems to download and for providing advertisement display information to the client systems via a network, the server system comprising a processor a memory coupled to the processor a communications interface for interfacing the server system with the network a communications module comprising computer readable instructions for causing data to be transmitted and received via the communications interface means for receiving contract information for a plurality of advertisements, wherein the contract information comprises demographic profile reach and frequency, duration and time of expiry means for storing the contract information in the memory means for receiving demographic information about a plurality of users of the client systems means for storing the demographic information in the memory means for selecting advertisements for the client systems to display based upon matches between the contract information and the demographic information means for storing the selections in the memory means for using an expected advertisement consumption for each user, and a current advertisement load and time to expiry for each user, to allocate the selected advertisements to users who are more likely to be exposed to the advertisements prior to the advertisements' respective time of expiry means for storing the allocations in the memory.

54. The server system for selecting advertisements for client systems to download and for providing advertisement display information to the client systems via a network of claim 53, further comprising means for determining an order and timing for sending the allocated advertisements to a given client system.

55. The server system for selecting advertisements for client systems to download and for providing advertisement display information to the client systems via a network of claim 54, wherein the means for determining an order and timing for sending the allocated advertisements comprises means for optimizing for maximum revenue based upon the contract information.

56. The server system for selecting advertisements for client systems to download and for providing advertisement display information to the client systems via a network of claim 54, wherein the means for determining an order and timing for sending the allocated advertisements comprises means for spreading downloading of advertisements across plural connections between the client system and a source of the advertisements.

57. The server system for selecting advertisements for client systems to download and for providing advertisement display information to the client systems via a network of claim 56, wherein the source of the advertisements is the server system.

58. The server system for selecting advertisements for client systems to download and for providing advertisement display information to the client systems via a network of claim 53, further comprising means for aggregating allocations of advertisements such that advertisements allocated to multiple users of the same client system will be transmitted only once to the client system.

59. The server system for selecting advertisements for client systems to download and for providing advertisement display information to the client systems via a network of claim 53, further comprising means for archiving the advertisement allocations for each client system.

60. A method of operating a client system to communicate with a network and display advertisements to a user of the client system, the network including servers storing advertisements, the client system comprising a display, a processor, and a memory coupled to the processor, the method comprising receiving a plurality of advertisements, wherein the advertisements are selected outside of the user's control storing the advertisements in the memory receiving priority information for the advertisements, the priority information comprising relative priorities for display of the advertisements storing the priority information in the memory setting a sequential order for displaying the advertisements according to the priority information storing the order for displaying the advertisements in the memory automatically displaying the advertisements in the stored order on the display.

61. The method of operating a client system to communicate with a network and display advertisements to a user of the client system of claim 60, wherein the step of setting a sequential order comprises assigning each advertisement to one of a plurality of queues, the queues corresponding to the priorities, wherein advertisements having the same priority are stored in the same queue the step of displaying the advertisements comprises displaying advertisements assigned to highest priority queues prior to displaying advertisements assigned to lower priority queues.

62. The method of operating a client system to communicate with a network and display advertisements to a user of the client system of claim 61, herein the step of displaying the advertisements further comprises cycling back to the highest priority queue after displaying all of the advertisements assigned to the lowest priority queue.

63. The method of operating a client system to communicate with a network and display advertisements to a user of the client system of claim 60 wherein the priority information includes scheduling information for the advertisements, the scheduling information including an expiration date after which the respective advertisement should not be displayed wherein the step of setting a sequential order comprises setting advertisements which will expire soon before advertisements which will expire later.

64. The method of operating a client system to communicate with a network and display advertisements to a user of the client system of claim 60 wherein the priority information includes exhaustion information, the exhaustion information including a number of times to display each advertisement wherein the step of setting a sequential order comprises setting advertisements which have more times to be displayed before advertisements which have fewer times to be displayed.

65. The method of operating a client system to communicate with a network and display advertisements to a user of the client system of claim 60 wherein the priority information includes revenue enhancement information, the revenue enhancement information comprising a benefit for displaying each advertisement wherein the step of setting a sequential order comprises setting advertisements which have a greater benefit for display before advertisements which have lesser benefit for display.

66. The method of operating a client system to communicate with a network and display advertisements to a user of the client system of claim 60, wherein the step of setting a sequential order for displaying the advertisements according to the priority information comprises calculating a set of delta values representing differences between scheduling parameters of a first advertisement and corresponding scheduling parameters of a second advertisement.

67. The method of operating a client system to communicate with a network and display advertisements to a user of the client system of claim 66, wherein the step of setting a sequential order further comprises solving a hyperplane equation using the set of delta values and a corresponding set of scheduling constants to identify which of the first and second advertisements has a higher priority.

68. A method of operating a server system to select advertisements for client systems to download and provide advertisement display information to the client systems via a network, the server system comprising a processor and a memory coupled to the processor; the method comprising receiving contract information for a plurality of advertisements, wherein the contract information comprises demographic profile reach and frequency, duration and time of expiry storing the contract information in the memory receiving demographic information about a plurality of uses of the client systems storing the demographic information in the memory selecting advertisements for the client systems to display based upon matches between the contract information and the demographic information storing the selections in the memory using an expected advertisement consumption for each user, and a current advertisement load and time to expiry for each user, allocating the selected advertisements to users who are more likely to be exposed to the advertisements prior to the advertisements' respective time of expiry storing the allocations in the memory.

69. The method of operating a server system to select advertisements for client systems to download and provide advertisement display information to the client systems via a network of claim 68, further comprising determining an order and timing for sending the allocated advertisements to a give client system.

70. The method of operating a server system to select advertisements for client systems download and provide advertisement display information to the client systems via a network of claim 69, wherein the step of determining an order and timing for sending the allocated advertisements comprises optimizing for maximum revenue based upon the contract information.

71. The method of operating a server system to select advertisements for client systems to download and provide advertisement display information to the client systems via a network of claim 69, wherein the step of determining an order and timing for sending the allocated advertisements comprises spreading downloading of advertisements across plural connections between the client system and a source of the advertisements.

72. The method of operating a server system to select advertisements for client systems to download and provide advertisement display information to the client systems via a network of claim 71, wherein the source of the advertisements is the server system.

73. The method of operating a server system to select advertisements for client systems to download and provide advertisement display information to the client systems via a network of claim 68, farther comprising aggregating allocations of advertisements such that advertisements allocated to multiple users of the same client system will be transmitted only once to the client system.

74. The method of operating a server system to select advertisements for client systems to download and provide advertisement display information to the client systems via a network of claim 68, further comprising archiving the advertisement allocations for each client system.

* * * * *

UNITED STATES PATENT AND TRADEMARK OFFICE
CERTIFICATE OF CORRECTION

PATENT NO. : 6,876,974 B1
DATED : April 5, 2005
INVENTOR(S) : Marsh et al.

It is certified that error appears in the above-identified patent and that said Letters Patent is hereby corrected as shown below:

Title page,
Item [74], *Attorney, Agent, or Firm*, replace "Steven C. Sexeboff" with -- Steven C. Sereboff --.

Column 6,
Line 50, replace "servers $N_0...M_n$" with -- servers $M_0...M_n$ --.

Column 10,
Line 48, replace "$(C_2*x_2)$" with -- $(c_2*x_2)$ --.
Line 54, replace "$X_3$=me" with -- $x_3$=me --.
Line 56, replace "$X_4$=pre" with -- $x_4$=pre --.

Column 11,
Line 2, replace "c, through $C_4$" with -- $c_1$ through $c_4$ --.

Column 12,
Line 51, replace "MSG, and $MSG_2$, MSG, will" with -- $MSG_1$ and $MSG_2$, $MSG_1$ will --.

Column 18,
Line 24, replace "wherein the contact information" with -- wherein the contract information --.
Line 63, replace "to uses of claim 1" with -- to users of claim 1 --.

Column 22,
Line 52, replace "to the processor, the computer" with -- to the processor; the computer --.
Line 58, replace "information comp-sing" with -- information comprising --.

Column 24,
Line 25, replace "program farther comprises" with -- program further comprises --.
Line 31, replace "order and tiring" with -- order and timing --.

Column 25,
Line 21, replace "same priority arm" with -- same priority are --.
Line 50, replace "times, to display" with -- times to display --.

Column 27,
Line 49, replace "claim 61, herein" with -- claims 61, wherein --.

UNITED STATES PATENT AND TRADEMARK OFFICE
CERTIFICATE OF CORRECTION

PATENT NO. : 6,876,974 B1
DATED : April 5, 2005
INVENTOR(S) : Marsh et al.

It is certified that error appears in the above-identified patent and that said Letters Patent is hereby corrected as shown below:

Column 28,
Line 41, replace "uses of the client system" with -- users of the client system --.
Line 60, replace "a give client system" with -- a given client system --.
Line 62, replace "systems download" with -- systems to download --.

Column 30,
Line 4, replace "claim 68, farther" with -- claim 68, further --.

Signed and Sealed this

Sixth Day of September, 2005

JON W. DUDAS
*Director of the United States Patent and Trademark Office*